United States Patent
Yun et al.

(10) Patent No.: US 7,495,814 B2
(45) Date of Patent: Feb. 24, 2009

(54) RASTER SCANNING-TYPE DISPLAY DEVICE USING DIFFRACTIVE OPTICAL MODULATOR

(75) Inventors: Sang Kyeong Yun, Gyeonggi-do (KR); Haeng Seok Yang, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 349 days.

(21) Appl. No.: 11/433,636

(22) Filed: May 12, 2006

(65) Prior Publication Data

US 2006/0262663 A1    Nov. 23, 2006

(30) Foreign Application Priority Data

May 12, 2005    (KR) .................. 10-2005-0039809

(51) Int. Cl.
*G02B 26/08* (2006.01)
(52) U.S. Cl. .................. 359/212; 359/197; 359/215; 359/220; 359/221; 359/224; 359/225; 359/226; 359/231; 359/562; 359/563; 359/566; 359/567; 359/569; 359/572; 359/573
(58) Field of Classification Search ........... 359/197, 359/212–215, 220, 221, 223, 225, 226, 231, 359/562, 563, 566, 567, 569, 572, 573
See application file for complete search history.

(56) References Cited

U.S. PATENT DOCUMENTS 4,213,146 A * 7/1980 Maiman .................. 348/205
5,311,360 A   5/1994 Bloom et al.

FOREIGN PATENT DOCUMENTS

JP    1990-039018 A    2/1990
WO    2004/031832 A1   4/2004

* cited by examiner

*Primary Examiner*—Evelyn A. Lester
(74) *Attorney, Agent, or Firm*—Christensen O'Connor Johnson Kindness PLLC

(57) ABSTRACT

Disclosed herein is a raster scanning-type display device using a diffractive optical modulator. The raster scanning-type display device includes an optical illumination unit, a diffractive optical modulator, and a projection unit. The optical illumination unit radiates light, which is emitted from a light source, in a spot beam form. The diffractive optical modulator causes an element to modulate the spot beam incident from the optical illumination unit, and generate diffracted light whose intensity is adjusted and which has a plurality of diffraction orders. The projection unit generates an image by projecting the diffracted light incident from the diffractive optical modulator onto a screen in a scanning spot beam form and performing raster scanning in which horizontal scanning and vertical scanning are alternated.

20 Claims, 6 Drawing Sheets

RASTER SCANNING-TYPE DISPLAY DEVICE USING DIFFRACTIVE OPTICAL MODULATOR

BACKGROUND OF THE INVENTION

1. Field of the Invention

The present invention relates generally to a display device using a diffractive optical modulator and, more particularly, to a raster scanning-type display device using a diffractive optical modulator, which generates diffractive light whose intensity is adjusted by modulating a spot beam using one or more elements of a diffractive optical modulator, and then scans the generated diffractive light onto a screen in a scanning spot beam form and in a raster scanning fashion.

2. Description of the Related Art

With the development of micro technology, so-called micro Electro Mechanical Systems (MEMS) devices and small-sized equipment in which the MEMS devices are assembled have attracted significant attention.

A MEMS device is a device in which an actuation body that is formed on a substrate, such as a silicon substrate or a glass substrate, in a micro-structure form and is configured to output a mechanical actuation force, is electrically and mechanically combined with a semiconductor Integrated Circuit (IC) that is configured to control the actuation body. The MEMS device is basically characterized in that the actuation body having a mechanical structure is part of the device, and the operation of the actuation body is electrically performed using Coulomb's force between electrodes.

Recently, an optical modulator using the MEMS device has been developed. An example of such an optical modulator is the Grating Light Valve (GLV) disclosed in U.S. Pat. No. 5,311,360 by Bloom et al. In this patent, the GLV can be constructed to operate in reflecting and diffracting modes.

Meanwhile, in order to use a GLV device, that is, an optical modulation device to which the above-described MEM device is applied, for a display application, the development of a corresponding display device is required.

SUMMARY OF THE INVENTION

Accordingly, the present invention has been made keeping in mind the above problems occurring in the prior art, and an object of the present invention is to provide a raster scanning-type display device using a diffractive optical modulator, which generates diffractive light whose intensity is adjusted by modulating a spot beam using one or more elements of a diffractive optical modulator, and then scans the generated diffractive light onto a screen in a scanning spot beam form and in a raster scanning fashion.

In order to accomplish the above object, the present invention provides a raster scanning-type display device using a diffractive optical modulator, including an optical illumination unit for radiating light, which is emitted from a light source, in a spot beam form; a diffractive optical modulator for causing an element to modulate the spot beam incident from the optical illumination unit, and generate diffracted light whose intensity is adjusted and which has a plurality of diffraction orders; and a projection unit for generating an image by projecting the diffracted light incident from the diffractive optical modulator onto a screen in a scanning spot beam form and performing raster scanning in which horizontal scanning and vertical scanning are alternated.

In addition, the present invention provides a raster scanning-type display device using a diffractive optical modulator, including an optical illumination unit for radiating light, which is emitted from a light source in a spot beam form; a diffractive optical modulator for causing a plurality of elements to modulate the spot beam incident from the optical illumination unit, and generate diffracted light whose intensity is adjusted and which has a plurality of diffraction orders; and a projection unit for generating an image by projecting the diffracted light incident from the diffractive optical modulator onto a screen in a scanning spot beam form and performing raster scanning in which horizontal scanning and vertical scanning are alternated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

A raster scanning-type display device using a diffractive optical modulator according to a preferred embodiment of the present invention will now be described with reference to the accompanying drawings.

Figure 1:
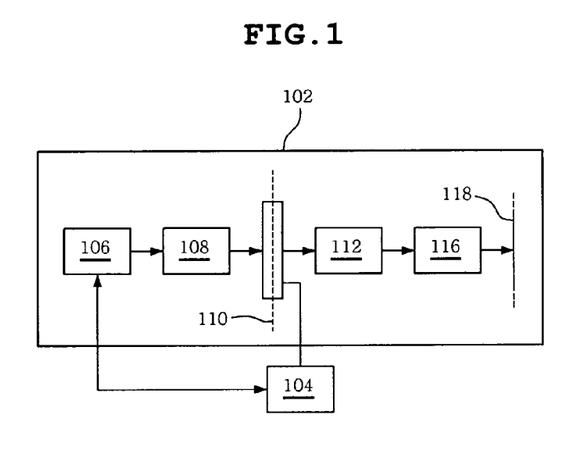
FIG. 1 is a block diagram showing the construction of a raster scanning-type display device using a diffractive optical modulator according to an embodiment of the present invention.

FIG. 1 is a block diagram showing the construction of a raster scanning-type display device using a diffractive optical modulator according to an embodiment of the present invention.

Referring to FIG. 1, the raster scanning-type display device using the diffractive optical modulator according to the embodiment of the present invention includes an optical display system 102 and an electronic display system 104. The optical display system 102 includes a laser 106, an optical illumination unit 108 for generating a circular or elliptical spot beam in order to radiate light, which is emitted from the laser 106, onto a diffractive optical modulator 110 in a circular or elliptical spot beam form, the diffractive optical modulator 110 for diffracting the spot beam illuminated from the optical illumination unit 108 and, thereby, generating diffracted light having desired diffraction orders, that is, diffracted light having a plurality of diffraction orders the intensity of which is adjusted, an optical filter unit 112 for separating the diffracted light, which has a plurality of diffraction orders and is emitted by the diffractive optical modulator 110, according to order and passing diffracted light having desired orders therethrough, a projection unit 116 for scanning the diffracted light, which passes through the optical filter unit 112, onto a display screen 118 in a scanning spot beam form and in a raster scanning fashion, and the display screen 118.

The electronic display system 104 is connected with the laser 106, the diffractive optical modulator 110, and the projection unit 116.

The electronic display system 104 provides power to the laser 106. The laser 106 emits laser illumination. In this case, the section of the laser illumination is a circle, and the profile of the light intensity thereof is a Gaussian distribution. For example, the laser 106 (which actually includes Red (R), Green (G), and Blue (B) light sources) may sequentially emit R, G, and B light beams. The optical illumination unit 108 converts the laser illumination, which is emitted by the laser 106, into a circular or elliptical spot beam, and focuses it on the diffractive optical modulator 110. The optical illumination unit 108 may be constructed, for example, using a convex lens (not shown), or by a convex lens (not shown) and a collimating lens (not shown).

Meanwhile, when the circular or elliptical spot beam is incident from the optical illumination unit 108, the diffractive optical modulator 110 diffracts the spot beam light under the control of the electronic display system 104, and thereby generates diffracted light having a plurality of diffraction orders. At this time, the intensity of the diffracted light having desired diffraction orders is appropriately adjusted.

Figure 2A:
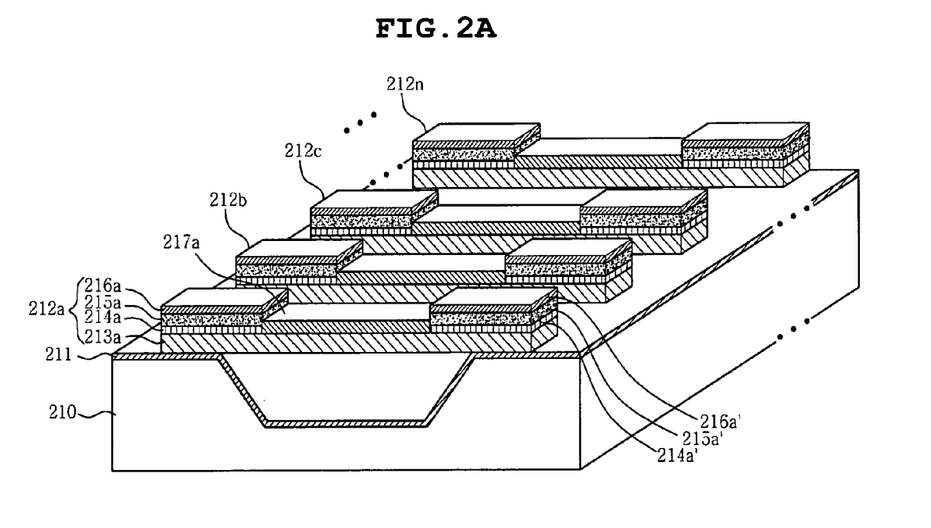
FIG. 2A is a perspective view of a recess and diffractive optical modulator used in the present invention.
Figure 2B:
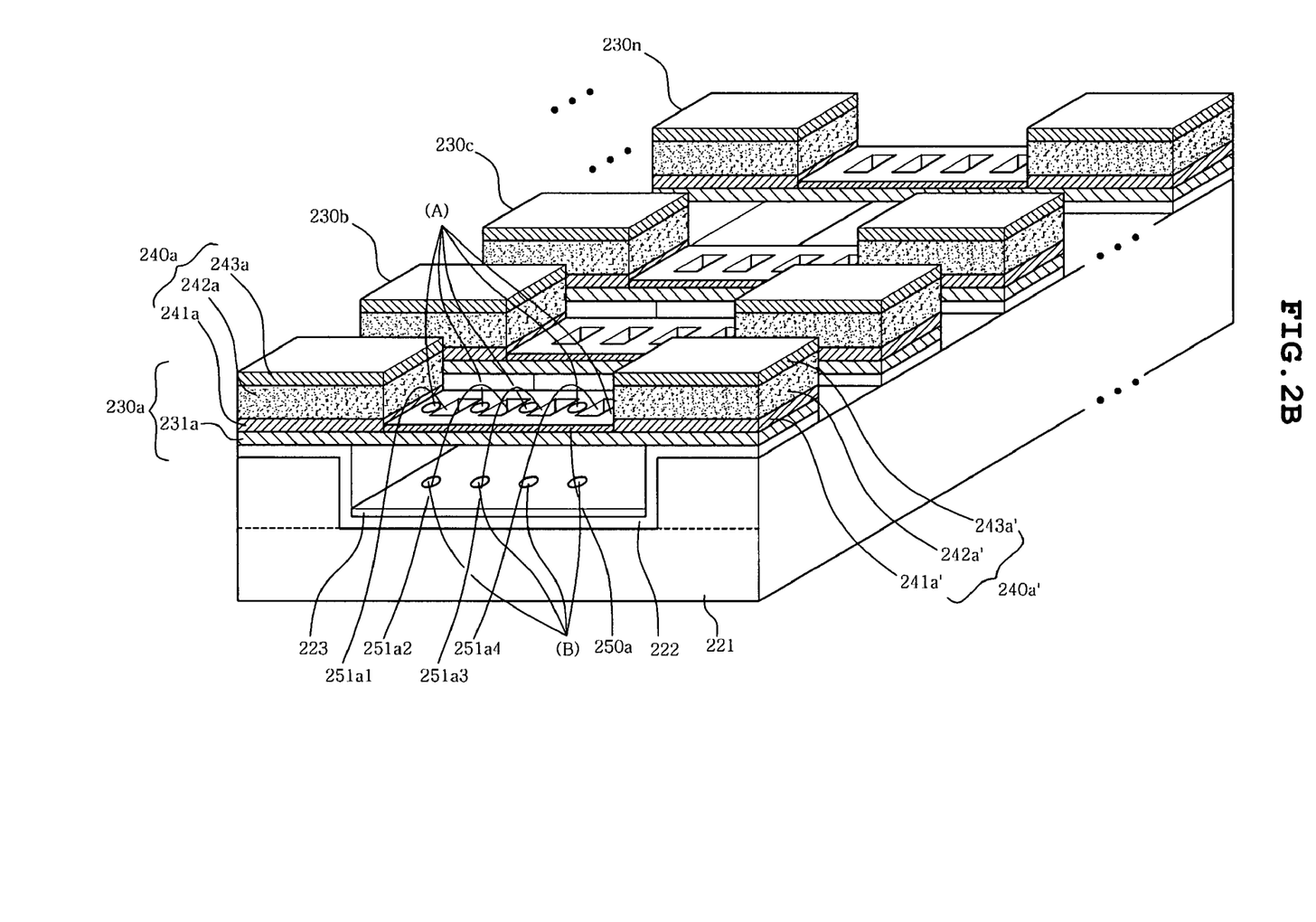
FIGS. 2B and 2C are perspective views of open hole-based diffractive optical modulators used in the present invention.
Figure 2C:
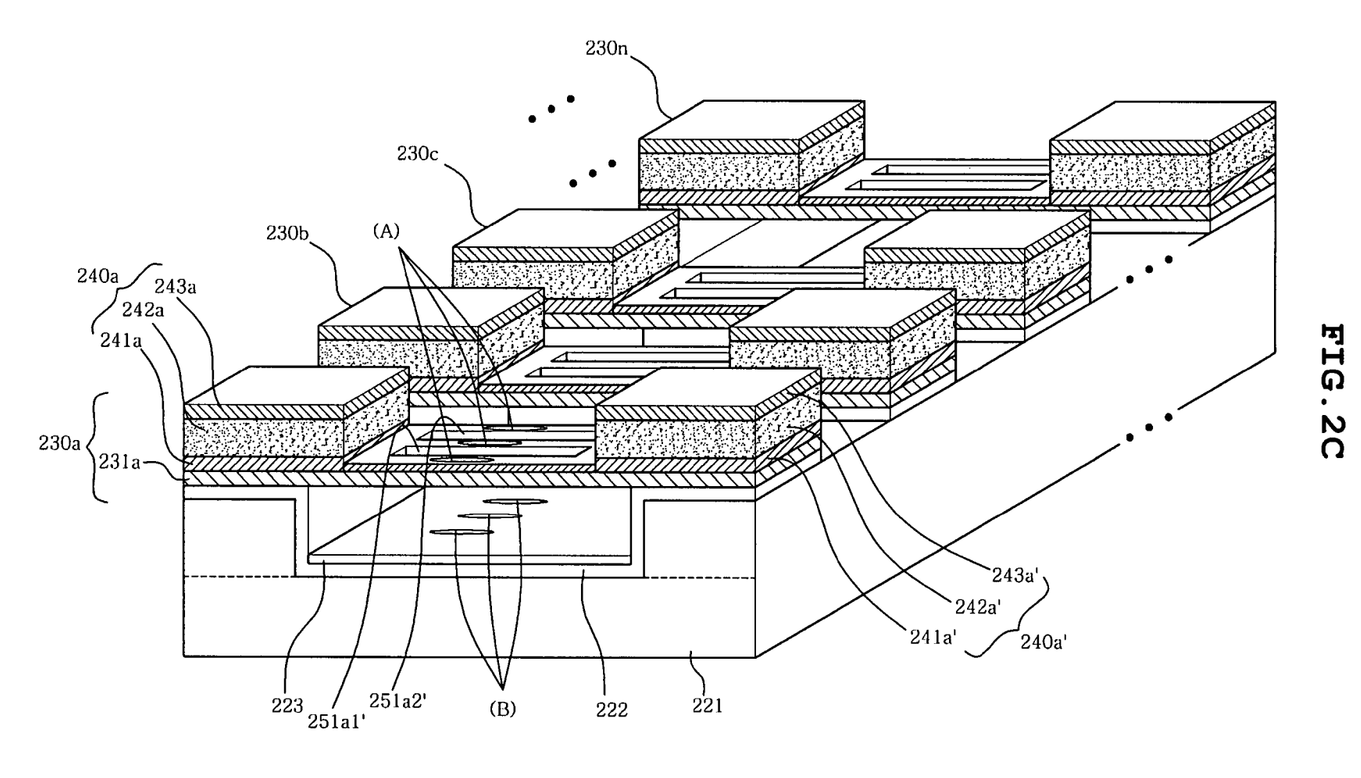

Examples of the diffractive optical modulator 110 are shown in FIGS. 2A to 2C. FIG. 2A is a perspective view of a recess and diffractive optical modulator that uses piezoelectric material and is used in the present invention, and FIGS. 2B and 2C are perspective views of open hole-based diffractive optical modulators that use piezoelectric material and are used in the present invention.

Referring to FIG. 2A, the recess and diffractive optical modulator used in the present invention includes a silicon substrate 210 and a plurality of elements 212a to 212n.

In this case, the plurality of elements 212a to 212n may constitute a single-panel diffractive optical modulator by having uniform widths and being uniformly arranged. Furthermore, the plurality of elements 212a to 212n may constitute a single-panel diffractive optical modulator by having widths different from each other and being alternately arranged. Furthermore, the elements 212a to 212n may be spaced apart the same distance (almost the same distance as the widths of the elements 212a to 212n). In this case, a micromirror layer formed over the entire upper surface of the silicon substrate 210 reflects and diffracts incident light.

The silicon substrate 210 is provided with a recess to define an air space for elements 212a to 212n, an insulation layer 211 is disposed on the silicon substrate 210, and the end portions of the elements 212a to 212n are attached beside the recess.

Each of the elements (although only a representative description of the element indicated by reference numeral 212a is made, the descriptions of the others 212b to 212n are the same) has a ribbon shape, and is provided with a lower support 213a, the lower surfaces of both ends of which are attached beside the recess of the silicon substrate 210 such that the center portion of the element is spaced apart from the recess of the silicon substrate 210, and a portion thereof located above the recess in the silicon substrate 210 is able to move upward and downward.

Furthermore, the element 212a includes a lower electrode layer 214a disposed on the left end portion of the lower support 213a and configured to provide piezoelectric voltage, a piezoelectric material layer 215a disposed on the lower electrode layer 214a and configured to generate upward and downward driving force by contracting and expanding when voltage is applied to both sides thereof, and an upper electrode layer 216a disposed on the piezoelectric material layer 215a and configured to provide piezoelectric voltage to the piezoelectric material layer 215a.

Furthermore, the element 212a includes a lower electrode layer 214a disposed on the right end portion of the lower support 213a and configured to provide piezoelectric voltage, a piezoelectric material layer 215a disposed on the lower electrode layer 214a and configured to generate upward and downward driving force by contracting and expanding when voltage is applied to both sides thereof, and an upper electrode layer 216a disposed on the piezoelectric material layer 215a and configured to provide piezoelectric voltage to the piezoelectric material layer 215a.

FIG. 2B is a perspective view of an open hole-based diffractive optical modulator used in the present invention. Referring to FIG. 2B, the open hole-based diffractive optical modulator includes a silicon substrate 221, an insulation layer 222, a lower micromirror 223, and a plurality of elements 230a to 230n.

In this case, the lower micromirror 223 is deposited on the upper portion of the silicon substrate 221, and diffracts incident light by reflecting it. The lower micromirror 223 may be formed of a material such as metal (Al, Pt, Cr or Ag).

Each of the elements (although only a representative description of the element indicated by reference numeral 230a is made, the others are the same) has a ribbon shape, and is provided with a lower support 231a, the lower surfaces of the two ends of which are respectively attached on two sides beside the recess of the silicon substrate 221 such that the center portion of the element is spaced apart from the recess of the silicon substrate 221.

Piezoelectric layers 240a and 240a' are formed on both sides of the lower support 231a, and the driving force of the element 230a is provided to the lower support 231a by the contraction and expansion of the piezoelectric layers 240a and 240a'.

Furthermore, the left and right piezoelectric layers 240a and 240a' include lower electrode layers 241a and 241a' for providing piezoelectric voltage, piezoelectric material layers 242a and 242a' disposed on the lower electrode layers 241a and 241a' and configured to generate upward and downward driving force by contracting and expanding when voltage is applied to both sides thereof, and upper electrode layers 242a and 242a' disposed on the piezoelectric material layers 242a and 242a' and configured to provide piezoelectric voltage to the piezoelectric material layers 242a and 242a'. When voltage is applied to the upper electrode layers 243a and 243a' and the lower electrode layers 241a and 241a', the piezoelectric material layers 242a and 242a' contract or expand, thus causing the lower support 231a to move upward or downward.

Meanwhile, an upper micromirror 250a is deposited on the center portion of the lower support 231a, and a plurality of open holes 251a1 to 251a4 is formed therein. In this case, although it is preferred that each of the open holes 251a1 to 251a4 be formed in a rectangular shape, they may be formed in any closed-curve shape, such as a circular shape or an elliptical shape. Furthermore, the open holes 251a1 to 251a4 are characteristically arranged in a direction perpendicular to the traverse direction of the silicon substrate 221.

The open holes 251a1 to 251a4 allow light incident on the element 230a to pass through the element 230a and be incident on the portions of the lower micromirror layer 223 corresponding to the open holes 251a1 to 251a4, thus causing diffracted light, which is formed by the lower micromirror layer 223 and the upper micromirror layer 250a, to form a single pixel.

That is, for example, light reflected from portion (A) of the upper micromirror layer 250a, through which the open holes 251a1 to 251a4 are formed, and light reflected from portion (B) of the lower micromirror layer 223 may form diffracted light corresponding to a single pixel.

In this case, incident light, which has passed through the portion of the upper micromirror layer 250a through which the open holes 251a1 to 251a4 are formed, can be incident on the corresponding reflection surface of the lower micromirror layer 223. When the interval between the upper micromirror layer 250a and the lower micromirror layer 223 is an odd multiple of $\lambda/4$, maximally diffracted light is generated.

Meanwhile, FIG. 2B describes the open hole-based diffractive optical modulator characterized in that the open holes 251a1 to 251a4 are arranged in a direction perpendicular to the traverse direction of the silicon substrate 221, and FIG. 3 describes the open hole-based diffractive optical modulator provided with the open holes 251a1 to 251a4 arranged in the traverse direction of the silicon substrate 221.

Figure 3A:
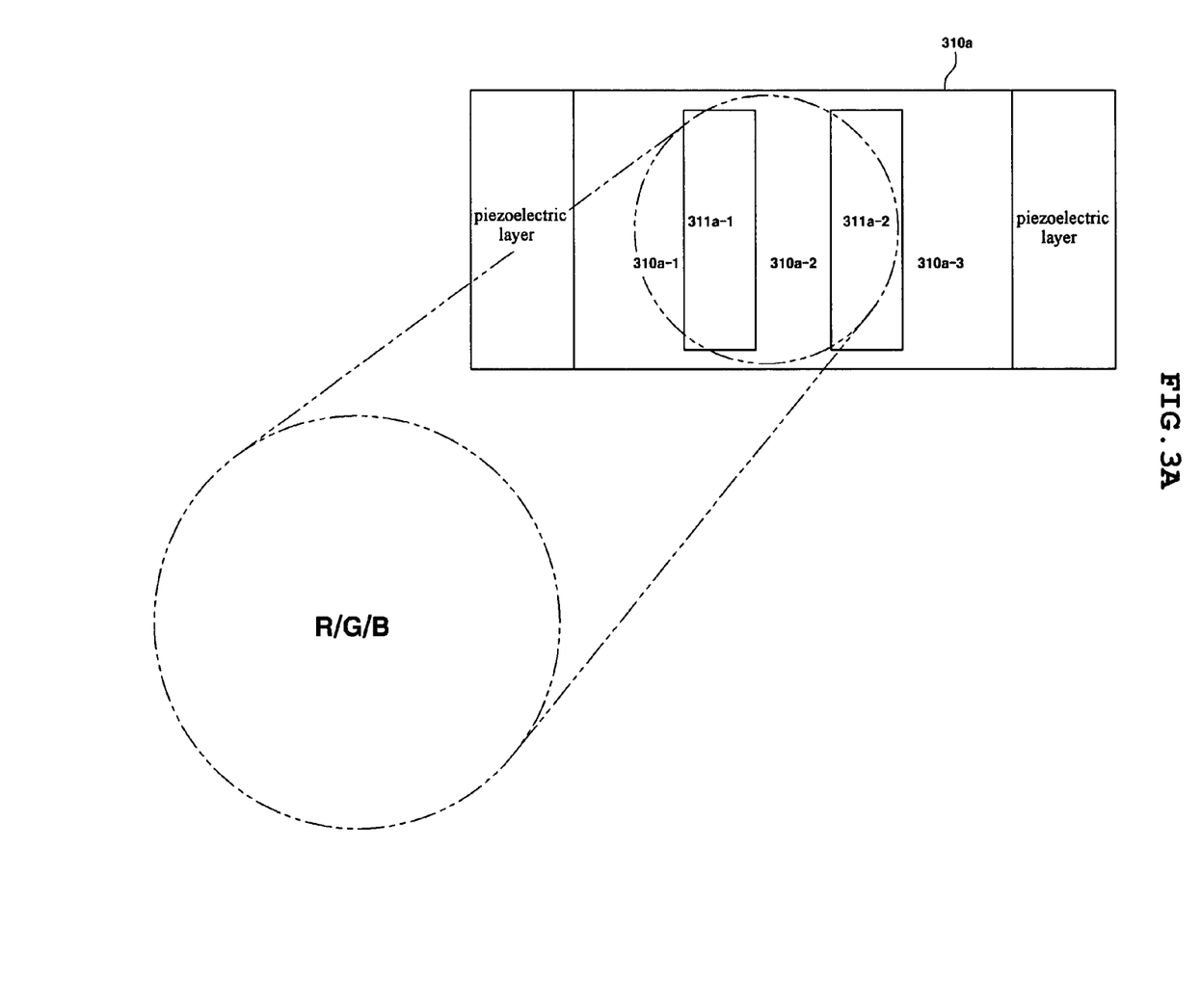
FIG. 3A is a plan view showing the case where circular spot beams are illuminated on the upper micromirror of one element of the open hole-based diffractive optical modulator according to an embodiment of the present invention.

FIG. 3A illustrates a plan view showing the case where circular R, G and B light beams are sequentially incident on the upper micromirror 310a of one element of the open hole-based diffractive optical modulator according to an embodiment of the present invention.

Referring to FIG. 3A, circular R, G and B light beams are sequentially incident on some 310a-1 and 310a-2 of all of the reflection surfaces 310a-1 to 310a-3 of the upper micromirror 310a, and all of the holes 311a-1 and 311a-2 of the upper micromirror 310a.

As described above, when a circular spot beam is incident on the reflection surfaces 310a-1 and 310a-2 of the upper micromirror 310a and the holes 311a-1 and 311a-2 of the upper micromirror 310a, the incident circular spot beam is diffracted due to the step difference that exists due to the reflection surfaces (not shown) of a lower micromirror (not shown) corresponding to the reflection surfaces 310a-1 and 310a-2 and holes 311a-1 and 311a-2 of the upper micromirror 310a and, thereby, diffracted light having a plurality of diffraction orders is generated.

In this case, when the step difference between the reflection surfaces 310a-1 and 310a-2 of the upper micromirror 310a and the corresponding reflection surfaces of the lower micromirror is varied by moving the upper micromirror 310a upward and downward, the intensity of the diffracted light varies, so that a two-dimensional image can be generated while raster scanning onto a screen (not shown) is performed.

In this case, although a description of the case where circular spot beams are incident on the upper micromirror 310a of the element was made above, the same description applies in the case where elliptical spot beams are incident on the upper micromirror 310a.

Figure 3B:
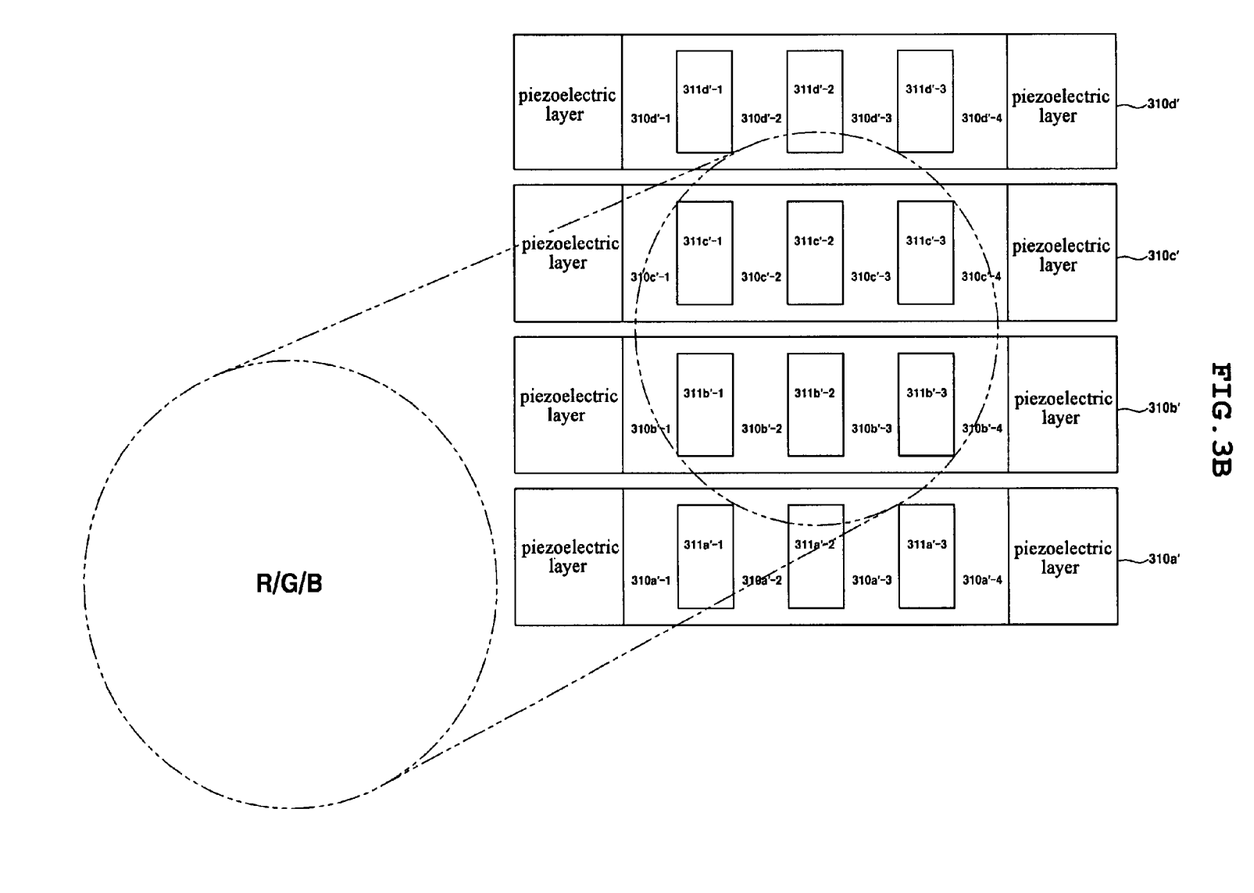
FIG. 3B is a plan view showing the case where circular spot beams are illuminated on the upper micromirrors of four elements of the open hole-based diffractive optical modulator according to an embodiment of the present invention.

FIG. 3B illustrates a plan view showing the case where circular R, G and B light beams are sequentially incident on the upper micromirrors 310a' to 310d' of four elements of the open hole-based diffractive optical modulator according to an embodiment of the present invention.

Referring to FIG. 3B, it can be seen that in the first upper micromirror 310a', which belongs to the upper micromirrors 310a' to 310d' of the four elements, the circular spot beams are incident on some 310a'-2 and 310a'-3 of all of the reflection surfaces 310a'-1 to 310a'-4 and some 311a'-2 of all of the holes 311a'-1 to 311a'-3. Furthermore, it can be seen that in the second upper micromirror 311b, the circular spot beams are incident on all of the reflection surfaces 310b'-1 to 310b'-4 and all of the holes 311b'-1 to 311b'-3. Furthermore, it can be seen that in the third upper micromirror 310c', the circular spot beams are incident on all of the reflection surfaces 310c'-1 to 310c'-4 and all of the holes 311c'-1 to 311c'-3. Furthermore it can be seen that in the fourth upper micromirror 310d', the circular spot beams are incident on some 310d'-2 and 310d'-3 of all of the reflection surfaces 310d'-1 to 310d'-4 and some 311d'-2 of all of the holes 311d'-1 to 311d'-3. In this case, although, in the upper micromirrors 310a' to 310d' of the four elements, the circular spot beams are sequentially incident on the some of the reflection surfaces and the some of the holes, the incident area may be widened in the case where elliptical or square spot beams, rather than circular spot beams, are used, according to the application, and the circular spot beams may be incident on all of the reflection surfaces and all of the holes.

As described above, when circular spot beams are incident on the some of the reflection surfaces and the some of the holes in the upper micromirrors 310a' to 310d', the incident circular spot beams are diffracted due to the step difference that exists due to some of the reflection surfaces (not shown) of a lower micromirror (not shown), corresponding to the some of the reflective surfaces of the upper micromirror 310a' to 310d' and the holes of the upper micromirror 310a' to 310d' and, thereby, diffracted light having a plurality of diffraction orders is generated.

In this case, when the step difference between the reflection surfaces of the upper micromirror 310a' to 310d' and the corresponding reflection surfaces of the lower micromirror is varied by moving the one or more upper micromirrors 310a' to 310d' upward and downward, the intensity of the diffracted light varies, so that a two-dimensional image can be generated while raster scanning onto a screen (not shown) is performed.

As describe above, when the diffracted light is generated using the plurality of elements, diffracted light having relatively wide light intensity selectivity can be generated, in contrast to when diffracted light is generated using a single element. For example, when diffracted light is generated using four elements, it is possible to cause only a single element, two elements, three elements or four elements to generate diffracted light Accordingly, when creating diffracted light, four diffracted light beams having different intensities can be acquired in the above-described manner, so that light intensity selectivity can be improved.

In this case, although a description of the case where circular spot beams are incident on the upper micromirrors 310a' to 310d' of the elements was made above, the same description applies in the case where elliptical spot beams are incident on the upper micromirrors 310a' to 310d'.

Meanwhile, the optical filter unit 112 separates diffracted light having desired orders therefrom when diffracted light having a plurality of diffraction orders is incident thereon. As an example, the optical filter unit is composed of a Fourier lens (not shown) and a Fourier filter (not shown), and selectively passes 0-order diffracted light or ±1-order diffracted light, among entering diffracted light beams, therethrough. Although the optical filter unit 112, as shown in FIG. 1, is located behind the diffractive optical modulator 110, the optical filter unit 112 is not limited thereto and may be located behind the projection unit 116. Furthermore, in the case where the optical filter unit 112 is located behind the projection unit 116, the diffracted light having a plurality of diffraction orders travels sufficiently and a predetermined distance between the diffraction orders is ensured, so that a separate Fourier lens for ensuring sufficient distance between the diffraction orders is not necessary, and the optical filter unit 112 may be implemented using a Fourier filter alone.

Figure 4:
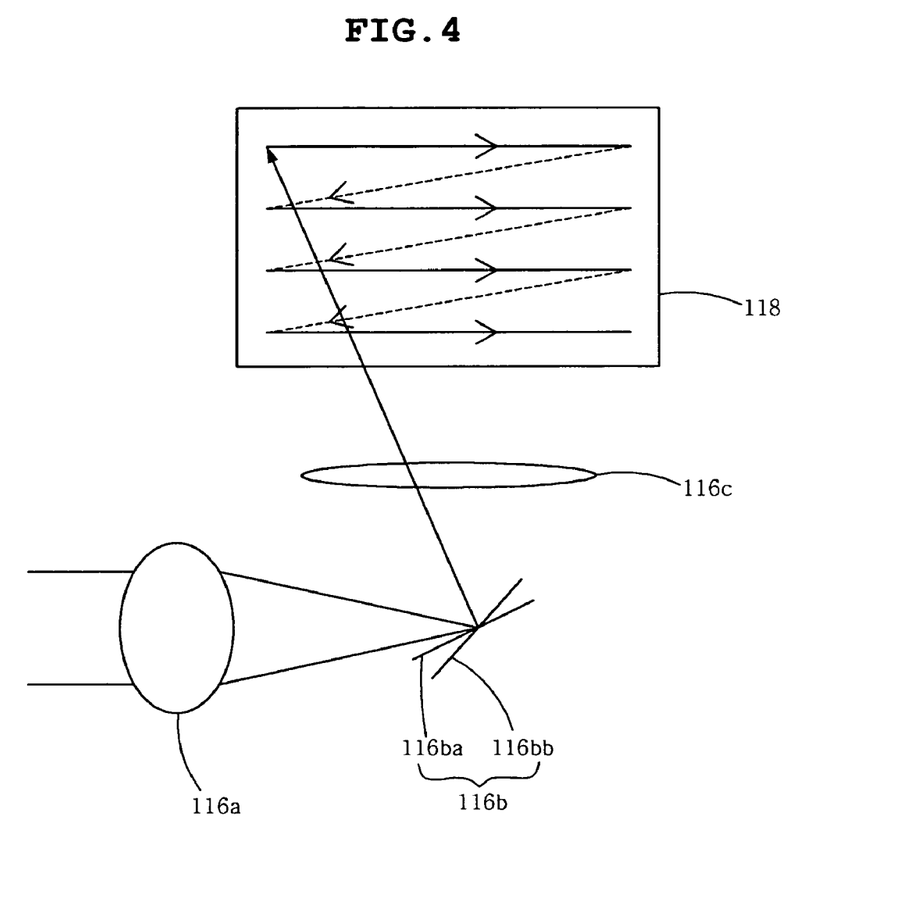
FIG. 4 is a diagram showing the construction of the projection unit of FIG. 1 in detail.

Furthermore, the projection unit 116, as shown in FIG. 4, is composed of a condenser lens 116a, a scanning mirror 116b, and a projection lens 116c, and projects entering diffracted light onto the screen 118. That is, the projection unit 116 plays the role of focusing diffracted light, entering through the Fourier filter (not shown), onto the screen 118 and generating a spot.

In this case, the condenser lens 116a condenses the diffracted light such that the diffracted light beams, which have passed through the Fourier filter (not shown), can be focused on the screen 118. A concave lens (not shown) may be further provided downstream of the condenser lens 116a, so that the diffracted light that has passed through the filter 112b may be condensed, converted into parallel light, and then projected onto the scanning mirror 116b.

The scanning mirror 116b is composed of an X scanning mirror 116ba and a Y scanning mirror 116bb. The X scanning mirror 116ba scans an incident spot on the screen 118 leftward and rightward under the control of the electronic display system 104, and the Y scanning mirror 116ba scans an incident spot onto the screen 118 upward and downward under the control of the electronic display system 104. The scanning mirror 116b may be constructed using an X-Y scanning mirror (not shown) that can perform both X-axis scanning and Y-axis scanning, rather than a combination of the X scanning mirror 116ba and the Y scanning mirror 116bb.

A description of the raster scanning is made in detail. As shown in FIG. 4, left-right scanning is first performed from the left to the right by the X scanning mirror 116ba and then up-down scanning to a subsequent line is performed by the Y scanning mirror 116bb. Thereafter, right-left scanning is performed from the right to the left by the X scanning mirror 116ba and then up-down scanning to a subsequent line is performed again by the Y scanning mirror 116bb. The above-described operation of the X scanning mirror 116ba, which is repeated, is referred to as raster scanning. As another example of raster scanning, a series of operations, in which scanning is performed from the left to the right, up-down scanning to the right side of a subsequent line is performed, scanning is performed from the right to the left, the line is changed, and then scanning is performed from the left to the right, may be repeated.

The electronic display system 104 operates the scanning mirror 116b of the projection unit 116. In order to form a two-dimensional image on the display screen 118, the projection unit 116 projects the scanning spot beam onto the display screen 118 and scans the scanning spot beam over the display screen 118 in a raster scanning fashion.

Meanwhile, in FIGS. 1 to 4, although a two-dimensional image is generated using a single scanning spot beam that takes chare of a single pixel, it is possible to generate a two-dimensional image using scanning spot beams that take charge of a small number of pixels and correspond to the number of the pixels.

Furthermore, in FIGS. 1 to 4, although a color image is generated using a single diffractive optical modulator, it may be possible to generate a color image using three diffractive optical modulators. In this case, two additional diffractive optical modulators are necessary for implementation of the color image.

In accordance with the present invention described above, a line beam shaper that is necessary for a one-dimensional illumination system, that is, an accurate optical system that converts circular light to linear light, is no longer necessary.

Furthermore, in accordance with the present invention, one or a small number of scanning spot beams that take charge of one or a small number of pixels are used, so that the optical system can be simplified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A raster scanning display device using a diffractive optical modulator, comprising:
   (a) an optical illumination unit for radiating light, which is emitted from a light source, in a spot beam form;
   (b) a diffractive optical modulator for causing an element to modulate the spot beam incident from the optical illumination unit, and generate diffracted light whose intensity is adjusted and which has a plurality of diffraction orders;
   (c) a projection unit for generating an image by projecting the diffracted light incident from the diffractive optical modulator onto a screen in a scanning spot beam form and performing raster scanning in which horizontal scanning and vertical scanning are alternated; and
   (d) wherein the diffractive optical modulator comprises:
      a base member;
      a first reflection part configured such that the first reflection part is supported by the base member, an intermediate part of the first reflection part is spaced apart from the base member to form a space therebetween, and a surface of the first reflection part opposite the base member is formed of a reflection surface to reflect incident light;
      a second reflection part configured to be spaced apart from the first reflection part between the base member and the first reflection part, and to have a reflection surface for reflecting the incident light; and
      actuation means for moving the intermediate part of the first reflection part so as to move away from or approach the base member, thus changing intensity of diffracted light that originates from light reflected from the first reflection part and the second reflection part.

2. The raster scanning display device as set forth in claim 1, wherein the optical illumination unit comprises a convex lens for forming the spot beam by condensing light emitted from the light source.

3. The raster scanning display device as set forth in claim 1, wherein the optical illumination unit comprises:
   a convex lens for forming the spot beam by condensing light emitted from the light source; and
   a collimate lens for converting the light, which has passed through the convex lens, into parallel light.

4. The raster scanning display device as set forth in claim 1, wherein the projection unit comprises:
   a horizontal scanner for scanning the diffracted light incident from the diffractive optical modulator in a scanning spot beam form and in a horizontal direction; and
   a vertical scanner for scanning the diffracted light incident from the diffractive optical modulator in a scanning spot beam form in a vertical direction;
   wherein, when the horizontal scanner completes single line scanning in the vertical direction, an operation in which the vertical scanner performs vertical scanning to a subsequent line is repeated.

5. The raster scanning display device as set forth in claim 1, wherein the projection unit comprises a horizontal and vertical scanner for repeating an operation of scanning the diffracted light incident from the diffractive optical modulator in a scanning spot beam form in a horizontal direction, and performing vertical scanning to a subsequent line when single line scanning is completed.

6. The raster scanning display device as set forth in claim 1, further comprising an optical filter unit located behind the diffractive optical modulator, and configured to select diffracted light having desired orders from among diffracted light that is formed by the diffractive optical modulator and has a plurality of diffraction orders, and to pass the selected diffracted light therethrough.

7. A raster scanning display device using a diffractive optical modulator, comprising:
   (a) an optical illumination unit for radiating light, which is emitted from a light source, in a spot beam form;
   (b) a diffractive optical modulator for causing an element to modulate the spot beam incident from the optical illumination unit, and generate diffracted light whose intensity is adjusted and which has a plurality of diffraction orders;
   (c) a projection unit for generating an image by projecting the diffracted light incident from the diffractive optical modulator onto a screen in a scanning spot beam form and performing raster scanning in which horizontal scanning and vertical scanning are alternated; and
   (d) wherein the diffractive optical modulator comprises:
      a base member;
      a first reflection part configured such that the first reflection part is supported by the base member, an intermediate part of the first reflection part is spaced apart from the base member to form a space therebetween, a surface of the first reflection part opposite the base member is formed of a reflection surface to reflect incident light, and one or more open holes are formed to pass the incident light therethrough;
      a second reflection part configured to be spaced apart from the first reflection part between the base member and the first reflection part, and to have a reflection surface for reflecting the incident light that passes through the open holes of the first reflection part; and
      actuation means for moving the intermediate part of the first reflection part so as to move away from or approach the base member, thus changing intensity of diffracted light that originates from light reflected from the first reflection parts and the second reflection part.

8. The raster scanning display device as set forth in claim 7, further comprising an optical filter unit located behind the diffractive optical modulator, and configured to select diffracted light having desired orders from among diffracted light that is formed by the diffractive optical modulator and has a plurality of diffraction orders, and to pass the selected diffracted light therethrough.

9. The raster scanning display device as set forth in claim 7, wherein the optical illumination unit comprises a convex lens for forming the spot beam by condensing light emitted from the light source.

10. The raster scanning display device as set forth in claim 7, wherein the optical illumination unit comprises;
    a convex lens for forming the spot beam by condensing light emitted from the light source; and
    a collimate lens for converting the light, which has passed through the convex lens, into parallel light.

11. The raster scanning display device as set forth in claim 7, wherein the projection unit comprises;
    a horizontal scanner for scanning the diffracted light incident from the diffractive optical modulator in a scanning spot beam form and in a horizontal direction; and
    a vertical scanner for scanning the diffracted light incident from the diffractive optical modulator in a scanning spot beam form in a vertical direction;
    wherein, when the horizontal scanner completes single line scanning in the vertical direction, an operation in which the vertical scanner performs vertical scanning to a subsequent line is repeated.

12. The raster scanning display device as set forth in claim 7, wherein the projection unit comprises a horizontal and vertical scanner for repeating an operation of scanning the diffracted light incident from the diffractive optical modulator in a scanning spot beam form in a horizontal direction, and performing vertical scanning to a subsequent line when single line scanning is completed.

13. A raster scanning display device using a diffractive optical modulator, comprising:
    (a) an optical illumination unit for radiating light, which is emitted from a light source, in a spot beam form;
    (b) a diffractive optical modulator for causing a plurality of elements to modulate the spot beam incident from the optical illumination unit, and generate diffracted light whose intensity is adjusted and which has a plurality of diffraction orders;
    (c) a projection unit for generating an image by projecting the diffracted light incident from the diffractive optical modulator onto a screen in a scanning spot beam form and performing raster scanning in which horizontal scanning and vertical scanning are alternated; and
    (d) wherein the diffractive optical modulator comprises:
       a base member;
       a plurality of first reflection parts arranged to form an array, and configured such that each of the first reflection parts is supported by the base member, an intermediate part of each of the first reflection parts is spaced apart from the base member to form a space therebetween, and a surface of each of the first reflection parts opposite the base member is formed of a reflection surface to reflect incident light;
       a second reflection part configured to be spaced apart from the first reflection parts between the base member and the first reflection parts, and to have a reflection surface for reflecting the incident light; and
       actuation means for moving the intermediate part of each of the first reflection parts so as to move away from or approach the base member, thus changing intensity of diffracted light that originates from light reflected from the first reflection parts and the second reflection part.

14. The raster scanning display device as set forth in claim 13, wherein the projection unit comprises a horizontal and vertical scanner for repeating an operation of scanning the diffracted light incident from the diffractive optical modulator in a scanning spot beam form in a horizontal direction, and performing vertical scanning to a subsequent line when single line scanning is completed.

15. The raster scanning display device as set forth in claim 13, wherein the projection unit comprises:
    a horizontal scanner for scanning the diffracted light incident from the diffractive optical modulator in a scanning spot beam in a horizontal direction; and a vertical scanner for scanning the diffracted light incident from the diffractive optical modulator in a scanning spot beam in a vertical direction;

wherein, when the horizontal scanner completes single line scanning in the vertical direction, an operation in which the vertical scanner performs vertical scanning to a subsequent line is repeated.

16. The raster scanning display device as set forth in claim 13, further comprising an optical filter unit located behind the diffractive optical modulator, and configured to select diffracted light having desired orders from among diffracted light that is formed by the diffractive optical modulator and has a plurality of diffraction orders, and to pass the selected diffracted light therethrough.

17. A raster scanning display device using a diffractive optical modulator, comprising:
 (a) an optical illumination unit for radiating light, which is emitted from a light source, in a spot beam form;
 (b) a diffractive optical modulator for causing a plurality of elements to modulate the spot beam incident from the optical illumination unit, and generate diffracted light whose intensity is adjusted and which has a plurality of diffraction orders;
 (c) a projection unit for generating an image by projecting the diffracted light incident from the diffractive optical modulator onto a screen in a scanning spot beam form and performing raster scanning in which horizontal scanning and vertical scanning are alternated; and
 (d) wherein the diffractive optical modulator comprises:
  a base member;
  a plurality of first reflection parts arranged to form an array, configured such that each of the first reflection parts is supported by the base member, an intermediate part of each of the first reflection parts is spaced apart from the base member to form a space therebetween, a surface of each of the first reflection parts opposite the base member is formed of a reflection surface to reflect incident light, and one or more open holes are formed to pass the incident light therethrough;
  a second reflection part configured to be spaced apart from the first reflection parts between the base member and the first reflection parts, and to have a reflection surface for reflecting the incident light that passes through the open holes of each of the first reflection parts; and
  actuation means for moving the intermediate part of each of the first reflection parts so as to move away from or approach the base member, thus changing intensity of diffracted light that originates from light reflected from the first reflection parts and the second reflection part.

18. The raster scanning display device as set forth in claim 17, further comprising an optical filter unit located behind the diffractive optical modulator, and configured to select diffracted light having desired orders from among diffracted light that is formed by the diffractive optical modulator and has a plurality of diffraction orders, and to pass the selected diffracted light therethrough.

19. The raster scanning display device as set forth in claim 17, wherein the projection unit comprises;
 a horizontal scanner for scanning the diffracted light incident from the diffractive optical modulator in a scanning spot beam in a horizontal direction; and
 a vertical scanner for scanning the diffracted light incident from the diffractive optical modulator in a scanning spot beam in a vertical direction;
 wherein, when the horizontal scanner completes single line scanning in the vertical direction, an operation in which the vertical scanner performs vertical scanning to a subsequent line is repeated.

20. The raster scanning display device as set forth in claim 17, wherein the projection unit comprises a horizontal and vertical scanner for repeating an operation of scanning the diffracted light incident from the diffractive optical modulator in a scanning spot beam form in a horizontal direction, and performing vertical scanning to a subsequent line when single line scanning is completed.

\* \* \* \* \*